United States Patent [19]

Bellin

[11] Patent Number: 5,594,951
[45] Date of Patent: Jan. 14, 1997

[54] METHOD AND APPARATUS FOR SAVING POWER IN A RADIOTELEPHONE

[75] Inventor: Nathan P. Bellin, Mount Prospect, Ill.

[73] Assignee: Motorola, Inc., Schaumburg, Ill.

[21] Appl. No.: 319,904

[22] Filed: Oct. 7, 1994

[51] Int. Cl.⁶ .................................................. H04B 1/40
[52] U.S. Cl. ............................ 455/89; 455/127; 455/343
[58] Field of Search ............................. 455/33.1, 38.3, 455/89, 127, 343, 33.2; 379/59, 60, 61, 190

[56] References Cited

U.S. PATENT DOCUMENTS

| | | | |
|---|---|---|---|
| 3,962,553 | 6/1976 | Linder et al. | 455/38.3 |
| 4,903,291 | 2/1990 | Tsurufuji et al. | 379/190 |
| 4,903,319 | 2/1990 | Kasai et al. | 455/127 |
| 5,027,428 | 6/1991 | Ishiguro et al. | 455/343 |

FOREIGN PATENT DOCUMENTS

| | | | |
|---|---|---|---|
| 0255048A2 | 2/1988 | European Pat. Off. . | |
| 0279697A2 | 2/1988 | European Pat. Off. . | |
| 0319211A2 | 6/1989 | European Pat. Off. . | |
| 0319219 | 6/1989 | European Pat. Off. | 455/127 |
| 0338834A2 | 10/1989 | European Pat. Off. . | |
| 0586170A1 | 3/1994 | European Pat. Off. . | |
| 0210738 | 11/1984 | Japan | 455/343 |
| 0162026 | 7/1991 | Japan | 455/89 |
| 2259431 | 3/1993 | United Kingdom . | |
| 9113509 | 9/1991 | WIPO | 379/61 |

*Primary Examiner*—Chi H. Pham
*Attorney, Agent, or Firm*—Dale B. Halling; Donald C. Kordich

[57] ABSTRACT

A radiotelephone (300) having timer shutoff feature and a roam shutoff feature. The timer shut off feature implements a process (102–114) in which a processor (310) determines (106) if a flip (408) is closed or an end key (410) has been pressed. If either of these events occur a timer is started (108). If the timer exceeds (110) a predetermined period of time before another phone call exists (112) the radiotelephone (300) is placed (114) in an off mode. The roam shutoff feature implements a process in which the processor (310) determines (116) if the radiotelephone (300) is in a roam mode. If the radiotelephone (300) is in a roam mode and no phone call exists (118) the radiotelephone (300) is placed (114) in the off mode.

19 Claims, 3 Drawing Sheets

METHOD AND APPARATUS FOR SAVING POWER IN A RADIOTELEPHONE

FIELD OF THE INVENTION

The present invention relates generally to the field of radiotelephones and more particularly to a method and an apparatus for saving power in a radiotelephone.

BACKGROUND OF THE INVENTION

As radiotelephones became smaller manufacturers started adding batteries to the radiotelephones to make them truly portable. Most efforts at reducing power or current drain have concentrated on reducing the power the individual components draw. While this is helpful, power is often wasted by having the radiotelephone on when the user does not expect or want to receive any phone calls.

One solution has been to add a real time clock to the radiotelephone and have turn on and turn off times. The user then defines a time at which his radiotelephone is automatically turned off, such as 9:00 PM. The user can also a define a time when his radiotelephone is turned on to receive calls, such as 7:00 AM. This allows the user to define a period of time in which he will not receive phone calls without having to remember to turn off the radiotelephone. This also saves battery power since the radiotelephone is not accidentally left on all night.

However, many circumstances exist where the user may want his radiotelephone automatically to turn off that are not related to the time of day. For instance, many user's do not wish to receive any phone calls on their radiotelephone, but only want to place out bound calls. They may wish to do this to extend the operating time between charges or to save money. Presently, the user then has to remember to turn off the radiotelephone when he is done placing calls to achieve this goal. When the user forgets to turn off his radiotelephone in these situations, he significantly limits the time between battery charges. In other cases, the user may not wish to receive phone calls when he is outside the range of his home base. This is known as roaming. Roaming charges can add substantially to user's monthly bill and leaving the radiotelephone on unnecessarily limits the time between charges.

Thus there exists a need for radiotelephone that automatically turns off, when the user does not wish to receive in bound calls or when his radiotelephone is in the roam mode.

DESCRIPTION OF THE PREFERRED EMBODIMENTS

Figure 1:
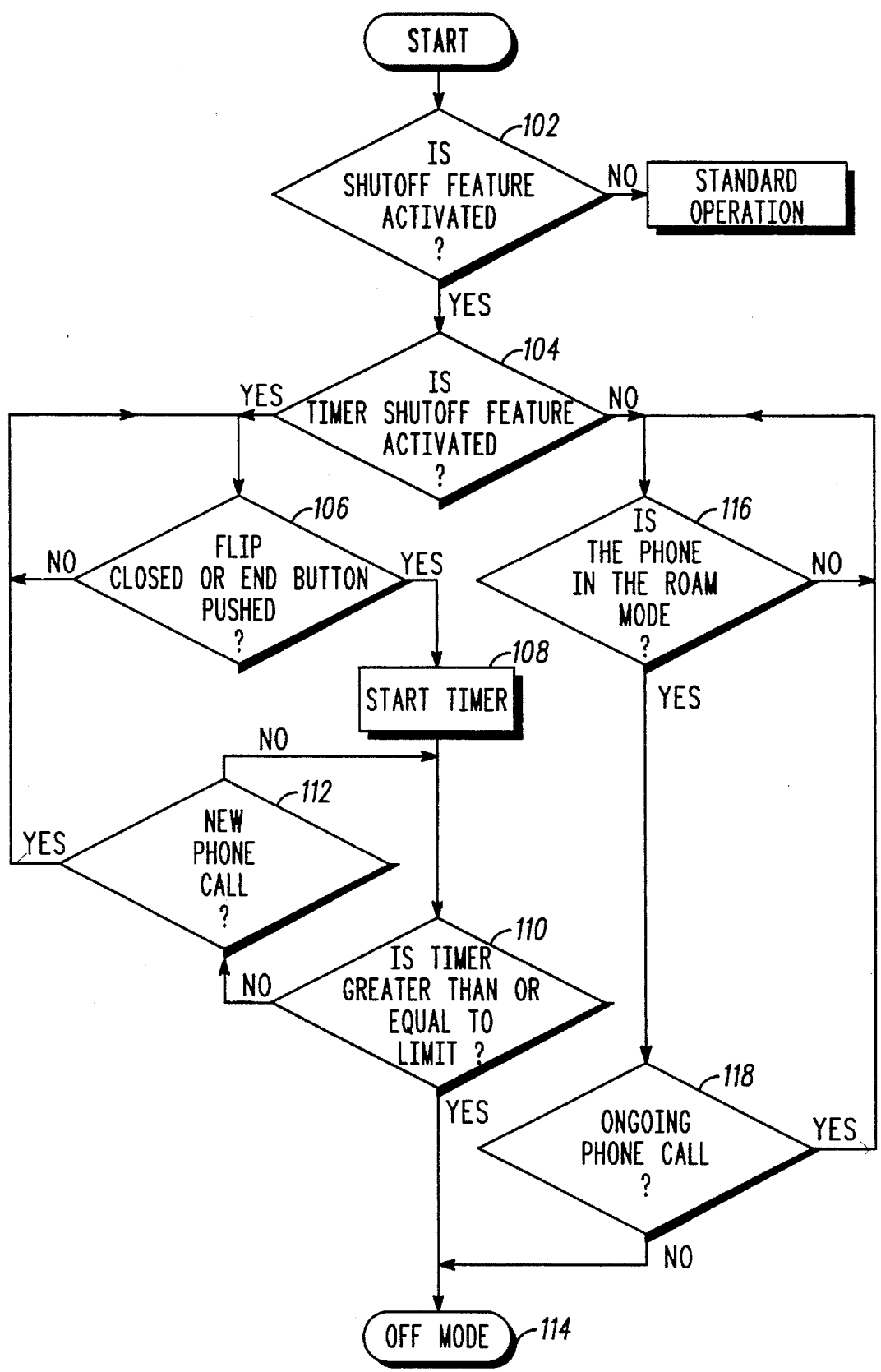
FIG. 1 is a flow diagram of a process that automatically turns off a radiotelephone according to the present invention.

FIG. 1 shows a flow diagram of a process that automatically turns off a radiotelephone when a user does not wish to receive in bound phone calls or when his radiotelephone is in the roam mode. The user can select either feature. If he does not wish to receive any in bound calls he selects a timer shutoff feature, in which he sets a time period after the end of a phone call that the radiotelephone automatically turns off. Assume the user calls his office, after finishing the call the user either hits an end key or shuts a flip to terminate the call. The timer shutoff feature then turns off the radiotelephone a predetermined period of time thereafter, such as thirty seconds. This allows the user time to find another phone number and place another call before the radiotelephone turns off.

The process of FIG. 1 shows how the timer shutoff feature is implemented. Block 102 determines if a shutoff feature is activated and block 104 determines if the timer shutoff feature is activated. The process then waits, block 106, until the flip is closed or the end button is pushed. A timer is started at block 108. In blocks 110 and 112, it is determined if the predetermined period of time has expired before a new phone call has occurred. If so the radiotelephone is placed, block 114, in the off mode. In the off mode the only function performed by the radiotelephone is to scan a keypad to determine if an on key has been pressed. This requires very little current.

The other power saving and money saving feature is the roam shutoff feature. This feature turns off the radiotelephone when it is outside its home service area, i.e. roaming. This feature is also shown in FIG. 1. Once it has been determined in blocks 102 and 104 that the shutoff feature is enabled and the timer shutoff feature is not activated, the process determines, block 116, if the radiotelephone is roaming, i.e. in roam mode. If the radiotelephone is in the roam mode, the process checks, block 118, to determine if a phone call is ongoing, if not the radiotelephone is placed in the off mode.

Figure 2:
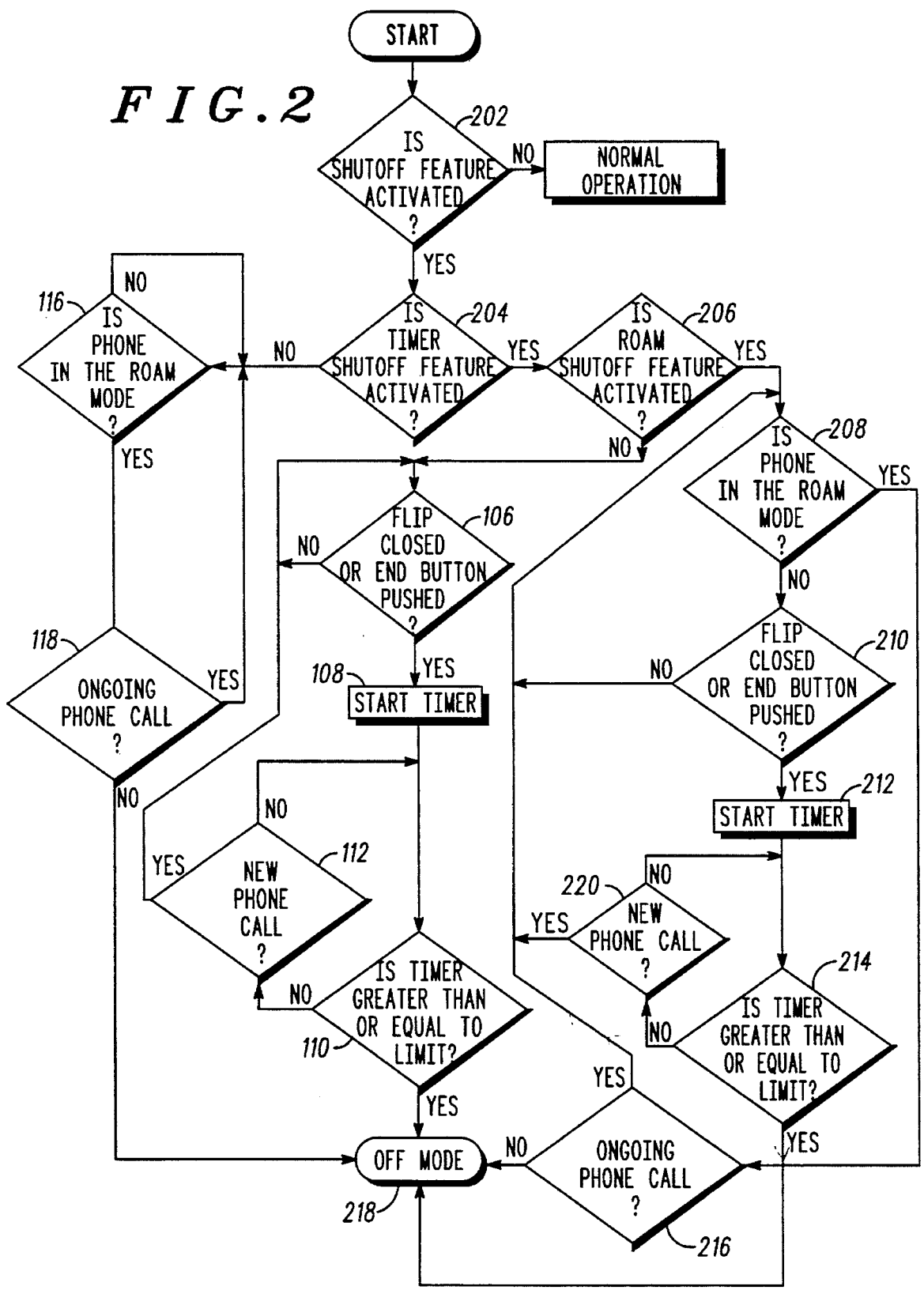
FIG. 2 is a flow diagram of an alternative process that automatically turns off a radiotelephone according to the present invention.

FIG. 2 illustrates an alternative way to implement the process of FIG. 1. The only difference being that in the process of FIG. 2 both the timer shutoff feature and the roam shutoff feature can be activated simultaneously. The path in the process where both features are activated simultaneously is shown in blocks 202 through 218.

Figure 3:
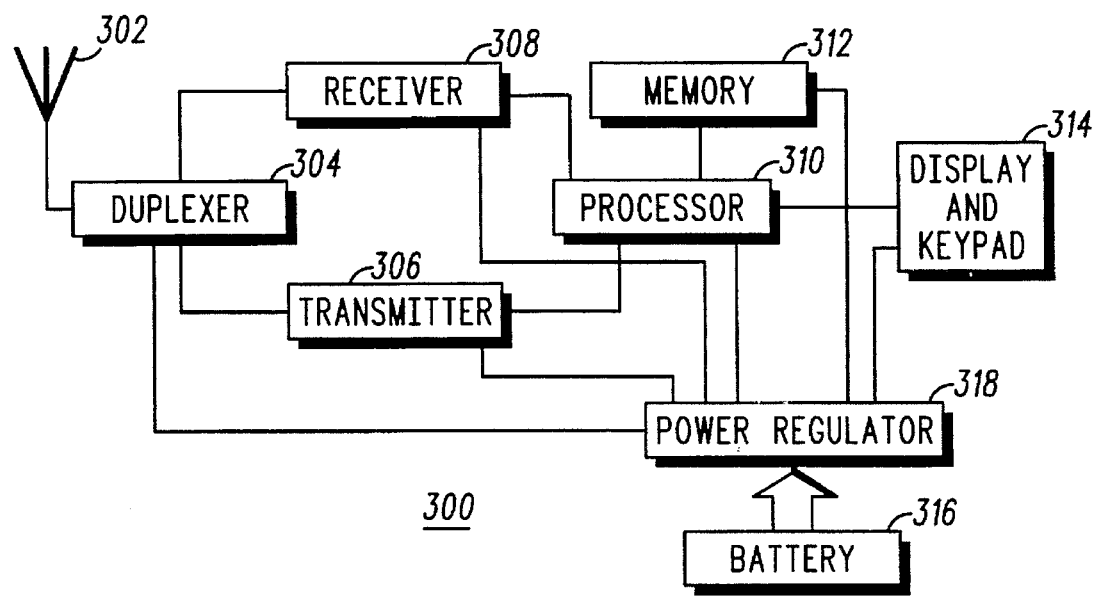
FIG. 3 is an electrical block diagram of a radiotelephone.

FIG. 3 shows an electrical block diagram of a radiotelephone 300 able to implement the processes described in FIGS. 1 and 2. The radiotelephone 300 has an antenna 302 connected to a duplexer 304. The duplexer 304 is connected to a transmitter 306 and a receiver 308, and isolates the energy between the transmit and receive paths. A processor 310 having an external memory 312 controls the radiotelephone 300 and implements the process described in FIGS. 1 and 2. The processor 310 is connected to a display and a keypad 314. A battery 316 provides power for portable operation and is connected to a power regulator 318. The power regulator 318 then supplies regulated power to the various part of the radiotelephone 300. When the radiotelephone 300 is in the off mode the processor 310 sends a signal to the power regulator 318 to turn power off to all parts of the radiotelephone 300, except the processor 310. Then the processor 310 scans an on button to determine if the user has depressed the on button. This scanning process requires very little current.

Figure 4:
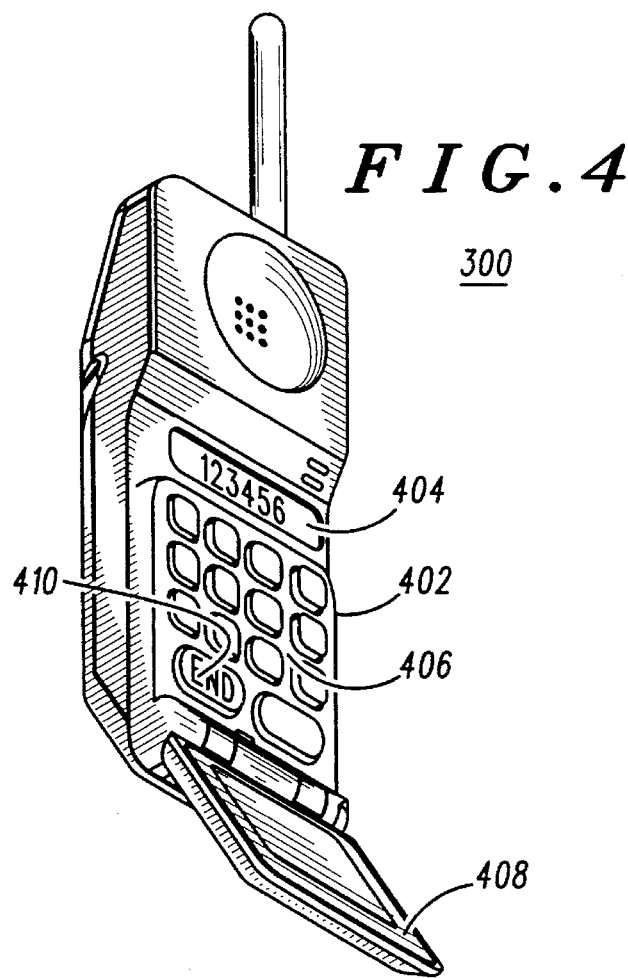
FIG. 4 is a left, top perspective view of a radiotelephone.

FIG. 4 shows perspective view of the radiotelephone 300. The radiotelephone 300 has a housing 402, a display portion 404 and a keypad 406. The lower portion of the housing 402 is pivotally connected to a flip 408. When the flip 408 is closed it covers the keypad 406. The keypad 406 also has an end key 410. The flip 408 or the end key 410 are used by the timer shutoff feature to determine when a phone call has ended.

In summary, the present invention provides a process and apparatus for saving power and money in a radiotelephone.

This is accomplished by automatically turning the radiotelephone off if the radiotelephone is in a roam mode or a predetermined period of time after a phone call has ended. In this way the user never accidentally leaves his radiotelephone on, which extends the time period between battery charges Further, the user can limit his radiotelephone usage to out bound phone calls, thus saving battery power and money.

What is claimed is:

1. A method of saving power in a radiotelephone having a power source, comprising the steps of:

determining if a power saving feature is enabled;

when the power saving feature is enabled, determining if a timer shutoff feature is activated;

when the timer shutoff feature is activated, detecting when call termination occurs;

starting a timer in response to detecting call termination;

determining if the timer exceeds a predetermined period of time; and when the timer exceeds the predetermined period of time, switching the radiotelephone to an off mode.

2. The method of claim 1, wherein the step of detecting when call termination occurs includes the sub-step of detecting if an end key has been pushed.

3. The method of claim 1, wherein the step of detecting when call termination occurs includes the step of detecting if a flip has been closed.

4. The method of claim 1, wherein the step of determining if the timer exceeds the predetermined period of time includes the step of selecting the predetermined period of time.

5. The method of claim 1 further comprising the steps of:

when the timer shutoff feature is not activated, determining if the radiotelephone is in a roam mode;

determining if an ongoing phone call exists; and when no ongoing phone call exists, switching the radiotelephone to the off mode.

6. The method of claim 1, wherein the step of determining if the timer exceeds a predetermined period of time includes the sub-step of determining if a new phone call occurs before the timer exceeds a predetermined period of time, wherein switching the radiotelephone to the off mode provided no new phone call occurs within the predetermined period of time.

7. A method of conserving battery power in a portable radiotelephone, the method comprising the steps of:

determining if a shutoff feature is enabled;

when the shutoff feature is enabled, determining if a timer shutoff feature is enabled;

when the timer shutoff feature is enabled, determining if a roam shutoff feature is enabled;

when the roam shutoff feature is enabled, determining if the radiotelephone is in a roam mode;

when the radiotelephone is in the roam mode, determining if an ongoing phone call exists; and when the ongoing phone call does not exist, placing the radiotelephone in an off mode.

8. The method of claim 7, wherein when the radiotelephone is not in the roam mode, the method further comprising the steps of:

determining if an end condition exists;

when the end condition exists, starting a timer;

determining if the timer exceeds a predetermined period of time; and when the timer exceeds a predetermined period of time, placing the radiotelephone in the off mode.

9. The method of claim 8, wherein when a new phone call occurs before the timer exceeds the predetermined period of time, performing the step of determining if the radiotelephone is in the roam mode.

10. The method of claim 7, wherein when the timer shutoff feature is enabled and the roam shutoff feature is not enabled, the method further comprising the steps of:

determining if an end condition exists;

when the end condition exists, starting a timer;

determining if the timer exceeds a predetermined period of time; and when the timer exceeds the predetermined period of time, placing the radiotelephone in the off mode.

11. The method of claim 10, wherein the step of determining if an end condition exists includes the sub-step of determining if an end button has been depressed.

12. The method of claim 10, wherein the step of determining if an end condition exists includes the sub-step of determining if a flip has been closed.

13. The method of claim 10, wherein the step of determining if an end condition exists includes the sub-step of determining if either an end button has been depressed or a flip has been closed.

14. The method of claim 8, wherein the step of determining if the timer exceeds a predetermined period of time includes the substep of determining if a new phone call occurs, wherein repeating the step of determining if the radiotelephone is in a roam mode when a new phone call occurs.

15. The method of claim 10, wherein the step of determining if the timer exceeds a predetermined period of time includes the substep of determining if a new phone call occurs, wherein repeating the step of determining if the radiotelephone is in a roam mode when a new phone call occurs.

16. A radiotelephone capable of receiving calls, making calls, and terminating calls, the radiotelephone comprising:

a power regulator for regulating power supplied to the radiotelephone, wherein the power regulator is responsive to a signal indicating power turn off; and a microprocessor, coupled to the power regulator, for detecting call termination, for detecting occurrence of a new call, and for generating the signal after a predetermined period of time following call termination provided no new call occurs within the predetermined period of time;

wherein, in response to the signal, the power regulator turns off power to the radiotelephone except the microprocessor.

17. A radiotelephone capable of receiving calls, making calls, and terminating calls, the radiotelephone comprising:

a power regulator for regulating power supplied to the radiotelephone, wherein the power regulator is responsive to a signal indicating power turn off; and a microprocessor, coupled to the power regulator, for detecting roam mode, for detecting an ongoing call, and for generating the signal when the roam mode is detected and there is no ongoing call;

wherein the power regulator turns off power to the radiotelephone except the microprocessor in response to the signal.

18. A method of turning off power to a radiotelephone including a microprocessor, the method comprising the steps of:

detecting call termination;

detecting occurrence of a new call;

generating, in response to detecting call termination and after a predetermined time, a signal indicating power turn off when the occurrence of a new call is not detected within the predetermined period of time; and in response to the generated signal, turning off power to the radiotelephone except the microprocessor.

19. A method of turning off power to a radiotelephone including a microprocessor, the method comprising the steps of:

detecting roam mode;

detecting no ongoing call;

generating, in response to detecting roam mode detecting no ongoing call, a signal indicating power turn off;

in response to the generated signal, turning off power to the radiotelephone except the microprocessor.

* * * * *